(12) United States Patent
Brewer et al.

(10) Patent No.: US 12,233,892 B2
(45) Date of Patent: *Feb. 25, 2025

(54) SYSTEM AND METHOD FOR OFF-ROAD DRIVING ASSISTANCE FOR A VEHICLE

(71) Applicant: Ford Global Technologies, LLC, Dearborn, MI (US)

(72) Inventors: Michael Edward Brewer, Dexter, MI (US); Kevin Sallee, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/426,462

(22) Filed: Jan. 30, 2024

(65) Prior Publication Data
US 2024/0166226 A1    May 23, 2024

Related U.S. Application Data

(63) Continuation of application No. 16/996,285, filed on Aug. 18, 2020, now Pat. No. 11,904,878.

(51) Int. Cl.
*B60W 50/10* (2012.01)
*B60W 10/04* (2006.01)
(Continued)

(52) U.S. Cl.
CPC ............ *B60W 50/10* (2013.01); *B60W 10/04* (2013.01); *B60W 10/18* (2013.01); *B60W 40/11* (2013.01);
(Continued)

(58) Field of Classification Search
CPC ...... B60W 50/10; B60W 10/04; B60W 10/18; B60W 40/11; B60W 2050/0026; B60W 2520/10; B60W 2520/16; B60W 2540/10; B60W 2540/12; B60W 50/082; B60W 2050/0055; B60W 2540/106; B60W 2710/0666; B60W 2710/182;
(Continued)

(56) References Cited

U.S. PATENT DOCUMENTS 11,358,477 B2 * 6/2022 Shiozawa ........... B60L 15/2018
11,584,225 B2 * 2/2023 Velazquez Alcantar .....................
B60K 26/02
(Continued)

FOREIGN PATENT DOCUMENTS

JP    2006137324 A    *  6/2006

OTHER PUBLICATIONS

JP-2006137324-A machine translation (Year: 2006).*

*Primary Examiner* — Angelina M Shudy
(74) *Attorney, Agent, or Firm* — Burr & Forman LLP; Lorne Forsythe (57) ABSTRACT

A vehicle control system for a vehicle may include a controller, a single pedal and a torque control module. The controller may be operably coupled to components and/or sensors of the vehicle to receive information indicative of operational intent of an operator of the vehicle and information indicative of vehicle status. The single pedal may be configured to provide the information indicative of operational intent. The torque control module may be configured to generate both a propulsive torque request and a braking torque request based on the information indicative of the operational intent and the information indicative of vehicle status.

17 Claims, 3 Drawing Sheets

(51) Int. Cl.
  *B60W 10/18* (2012.01)
  *B60W 40/11* (2012.01)
  *B60W 50/00* (2006.01)

(52) U.S. Cl.
  CPC . *B60W 2050/0026* (2013.01); *B60W 2520/10* (2013.01); *B60W 2520/16* (2013.01); *B60W 2540/10* (2013.01); *B60W 2540/12* (2013.01)

(58) Field of Classification Search
  CPC .......... B60W 10/184; B60W 30/18181; B60K 26/02; B60T 7/06
  See application file for complete search history.

(56) References Cited

U.S. PATENT DOCUMENTS

| | | | |
|---|---|---|---|
| 11,904,878 B2* | 2/2024 | Brewer | B60W 10/18 |
| 2007/0213910 A1* | 9/2007 | Doering | F02P 5/1504 |
| | | | 701/54 |
| 2017/0106839 A1* | 4/2017 | Uechi | B60T 8/246 |
| 2017/0361851 A1* | 12/2017 | Takeya | B60W 10/18 |
| 2018/0056987 A1* | 3/2018 | Suzuki | B60W 40/1005 |
| 2018/0162352 A1* | 6/2018 | Lee | B60W 10/06 |
| 2018/0186352 A1* | 7/2018 | Goto | B60T 8/1769 |
| 2018/0258866 A1* | 9/2018 | Bellino | F02D 11/02 |
| 2018/0319397 A1* | 11/2018 | Ohta | B60W 30/143 |
| 2018/0326852 A1* | 11/2018 | Shiozawa | B60L 9/18 |
| 2019/0389510 A1* | 12/2019 | Ogawa | B62D 6/10 |
| 2020/0023850 A1* | 1/2020 | Burford | B60W 30/18118 |
| 2020/0149484 A1* | 5/2020 | Geng | F02M 25/0854 |
| 2020/0172109 A1* | 6/2020 | Son | B60W 30/18127 |
| 2020/0180432 A1* | 6/2020 | Gauthier | B60W 30/18127 |
| 2020/0339081 A1* | 10/2020 | Suzuki | B60T 8/17 |
| 2021/0039504 A1* | 2/2021 | Umetsu | B60W 10/08 |
| 2021/0039624 A1* | 2/2021 | Umetsu | B60W 10/196 |
| 2022/0080942 A1* | 3/2022 | Eberl | B60W 10/18 |
| 2022/0097700 A1* | 3/2022 | Semenov | B60W 50/085 |
| 2022/0097706 A1* | 3/2022 | Bolger | B60W 50/0205 |
| 2022/0161796 A1* | 5/2022 | Ookawara | B60W 30/18072 |
| 2022/0176967 A1* | 6/2022 | Woodland | B60W 10/18 |
| 2022/0227237 A1* | 7/2022 | Otanez | B60L 15/2009 |
| 2022/0396153 A1* | 12/2022 | Miyamoto | B60W 10/06 |
| 2022/0396312 A1* | 12/2022 | Flumeri | B60L 3/106 |
| 2023/0027431 A1* | 1/2023 | Kaneko | B60W 30/045 |
| 2023/0119982 A1* | 4/2023 | Fridén | B60T 8/172 |
| | | | 303/121 |
| 2024/0001917 A1* | 1/2024 | Park | B60L 15/20 |
| 2024/0010207 A1* | 1/2024 | Weston | B60W 30/04 |
| 2024/0067143 A1* | 2/2024 | Cameron | B60T 8/268 |
| 2024/0262362 A1* | 8/2024 | Sugo | B60W 10/08 |

* cited by examiner

SYSTEM AND METHOD FOR OFF-ROAD DRIVING ASSISTANCE FOR A VEHICLE

CROSS-REFERENCE TO RELATED APPLICATIONS

This application is a continuation of U.S. application Ser. No. 16/996,285 filed on Aug. 18, 2020, the entire contents of which are hereby incorporated herein by reference.

TECHNICAL FIELD

Example embodiments generally relate to vehicle control algorithms and, more particularly, relate to a system and method for providing an off-road driver assistance feature.

BACKGROUND

Navigating off-road terrain with substantial obstacles (sometimes referred to as "rock-crawling") can often require coordinated application of both propulsive and braking torque. Traditionally, drivers control wheel speeds under such circumstances by modulating the accelerator and brake pedals simultaneously, which is known as "two-pedal driving." This technique can be difficult to employ for novices.

Thus, it may be desirable to develop a driver assistance feature that can be used to obviate the need for two-pedal driving.

BRIEF SUMMARY OF SOME EXAMPLES

In accordance with an example embodiment, a vehicle control system for a vehicle may be provided. The system may include a controller, a single pedal and a torque control module. The controller may be operably coupled to components and/or sensors of the vehicle to receive information indicative of operational intent of an operator of the vehicle and information indicative of vehicle status. The single pedal may be configured to provide the information indicative of operational intent. The torque control module may be configured to generate both a propulsive torque request and a braking torque request based on the information indicative of the operational intent and the information indicative of vehicle status.

In another example embodiment, torque control module of a vehicle control system may be provided. The torque control module may include a propulsive torque determiner configured to determine a propulsive torque request based on pedal position, vehicle speed and vehicle pitch, and a braking torque determiner configured to determine a braking torque request based on the pedal position, a rate of change of the pedal position, the vehicle speed and the vehicle pitch. The torque control module may be configured to determine an instantaneous net torque request as a combination of the propulsive torque request and the braking torque request based on the pedal position of a single pedal.

In another example embodiment, a method of providing a propulsive torque request to a propulsion system of a vehicle and a braking torque request to a braking system of the vehicle may be provided. The method may include receiving information indicative of operational intent of an operator of the vehicle relating to both the propulsive torque request and the braking torque request based on operation of a single pedal of the vehicle, receiving information indicative of vehicle status, and generating both the propulsive torque request and the braking torque request based on the information indicative of the operational intent and the information indicative of vehicle status.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, two-pedal driving, or at least driving on terrain with substantial obstacles (e.g., rock-crawling) presents certain challenges. For example, a first challenge posed by this operational context is the need to quickly transition from the significant propulsive force required for a drive wheel to overcome or climb to the apex of an obstacle to the significant brake torque required to prevent overshooting the driver's intended wheel positions after the vehicle as passed the apex and is on the descending side of the obstacle. Another challenge posed by this operational context is the balancing of brake and propulsive torques while launching the vehicle from a standstill position on a large grade, or on the ascending side of a significant obstacle. In this regard, it is typically desirable to enable a smooth forward vehicle motion without the vehicle rolling backward at all.

Some example embodiments described herein may obviate the need to learn or practice two-pedal driving by providing a driver assistance feature that can control the net torque applied at the wheels of the vehicle in order to control the wheel speeds. Some example embodiments may therefore provide a control system that allows the driver to directly control the net torque applied by the vehicle to the wheels using only a single control pedal (e.g., accelerator pedal or brake pedal). Simpler and possibly also superior control may therefore be achieved to assist drivers operating in off-road contexts. Moreover, while the control methods described herein could be employed primarily or even continuously, some example embodiments may provide the ability to select the employment of a single control pedal operable as described herein as a mode of operation. As such, two-pedal driving may be possible until the mode of control associated with example embodiments has been selected. As such, some example embodiments may provide an improved system for vehicle control that can yield benefits in both customer confidence and vehicle capability. As a result, vehicle performance and driver satisfaction may also be improved.

Figure 1:
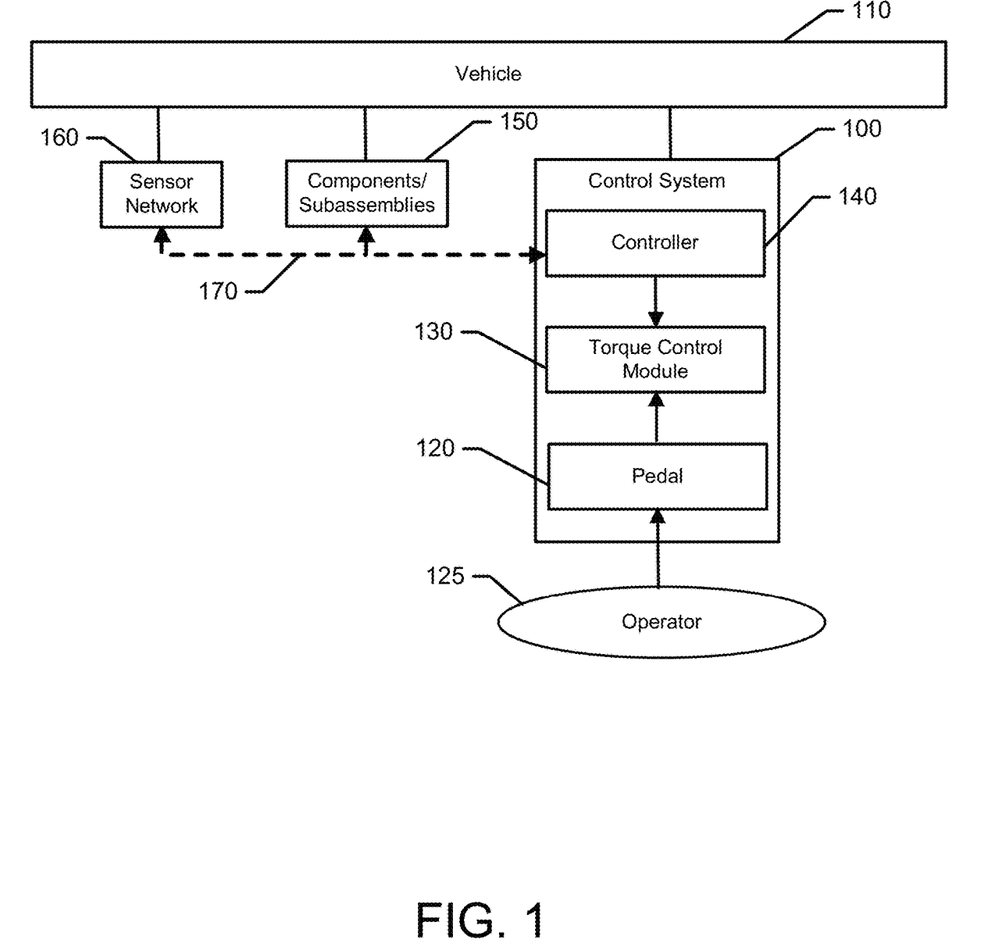
FIG. 1 illustrates a block diagram of a vehicle control system in accordance with an example embodiment.

FIG. 1 illustrates a block diagram of a control system 100 of an example embodiment. The components of the control system 100 may be incorporated into a vehicle 110 (e.g., via being operably coupled to a chassis of the vehicle 110, various components of the vehicle 110 and/or electronic control systems of the vehicle 110). Of note, although the components of FIG. 1 may be operably coupled to the vehicle 110, it should be appreciated that such connection may be either direct or indirect. Moreover, some of the components of the control system 100 may be connected to the vehicle 110 via intermediate connections to other components either of the chassis or of other electronic and/or mechanical systems or components.

The control system 100 may include an input device in the form of a control pedal (or simply a pedal 120). The pedal 120 may be similar to a conventional brake pedal or accelerator pedal pivotally mounted to the floor of the vehicle 110 in some cases. However, the pedal 120 could alternatively be hand operated, a single dedicated foot operated pedal, or any other operable member via which an operator 125 may provide an input indicative of an intent of the operator relative to controlling net torque for application to the wheels of the vehicle 110.

The control system 100 may also include a torque control module 130, which may be part of or otherwise operably coupled to a controller 140. The torque control module 130 may be configured to determine net torque as described herein based on inputs from any or all of the controller 140, the pedal 120 or other components of the vehicle 110. In some cases, the controller 140 may be part of an electronic control system of the vehicle 110 that is configured to perform other tasks related or not related to propulsive and braking control or performance management. However, the controller 140 could be a dedicated or standalone controller in some cases.

In an example embodiment, the controller 140 may receive information that is used to determine vehicle status from various components or subassemblies 150 of the vehicle 100. Additionally or alternatively, various sensors that may be operably coupled to the components or subassemblies 150 may be included, and may provide input to the controller 140 that is used in determining vehicle status. Such sensors may be part of a sensor network 160 and sensors of the sensor network 160 may be operably coupled to the controller 140 (and/or the components or subassemblies 150) via a vehicle communication bus (e.g., a controller area network (CAN) bus) 170.

The components or subassemblies 150 may include, for example, a brake assembly, a propulsion system and/or a wheel assembly of the vehicle 110. The brake assembly may be configured to provide braking inputs to braking components of the vehicle 110 (e.g., friction brakes and electrical methods of braking such as regenerative braking) based on a braking torque determined by the controller 140 and/or torque control module 130. The propulsion system may include a gas engine, electric motor, or any other suitable propulsion device. The controller 140 and/or torque control module 130 may be configured to determine propulsive torque inputs for provision to the propulsion system to apply propulsive torque to the wheels of the wheel assembly of the vehicle 110. Moreover, one or more corresponding sensors of the sensor network 160 that may be operably coupled to the brake assembly and/or the wheel assembly may provide information relating to brake torque, brake torque rate, vehicle velocity, vehicle acceleration, front/rear wheel speeds, vehicle pitch, etc. Other examples of the components or subassemblies 150 and/or corresponding sensors of the sensor network 160 may provide information relating to yaw, lateral G force, throttle position, selector button positions associated with chassis and/or vehicle control selections, etc.

Accordingly, for example, the controller 140 may be able to receive numerous different parameters, indications and other information that may be related to or indicative of different situations or conditions associated with vehicle status. The controller 140 may also receive information indicative of the intent of the operator 125 relative to control of various aspects of operation of the vehicle 110 and then be configured to use the information received in association with the execution of one or more control algorithms that may be used to provide instructions to the torque control module 130 in order to control application of net torque to the wheels of the wheel assembly of the vehicle 110.

Figure 2:
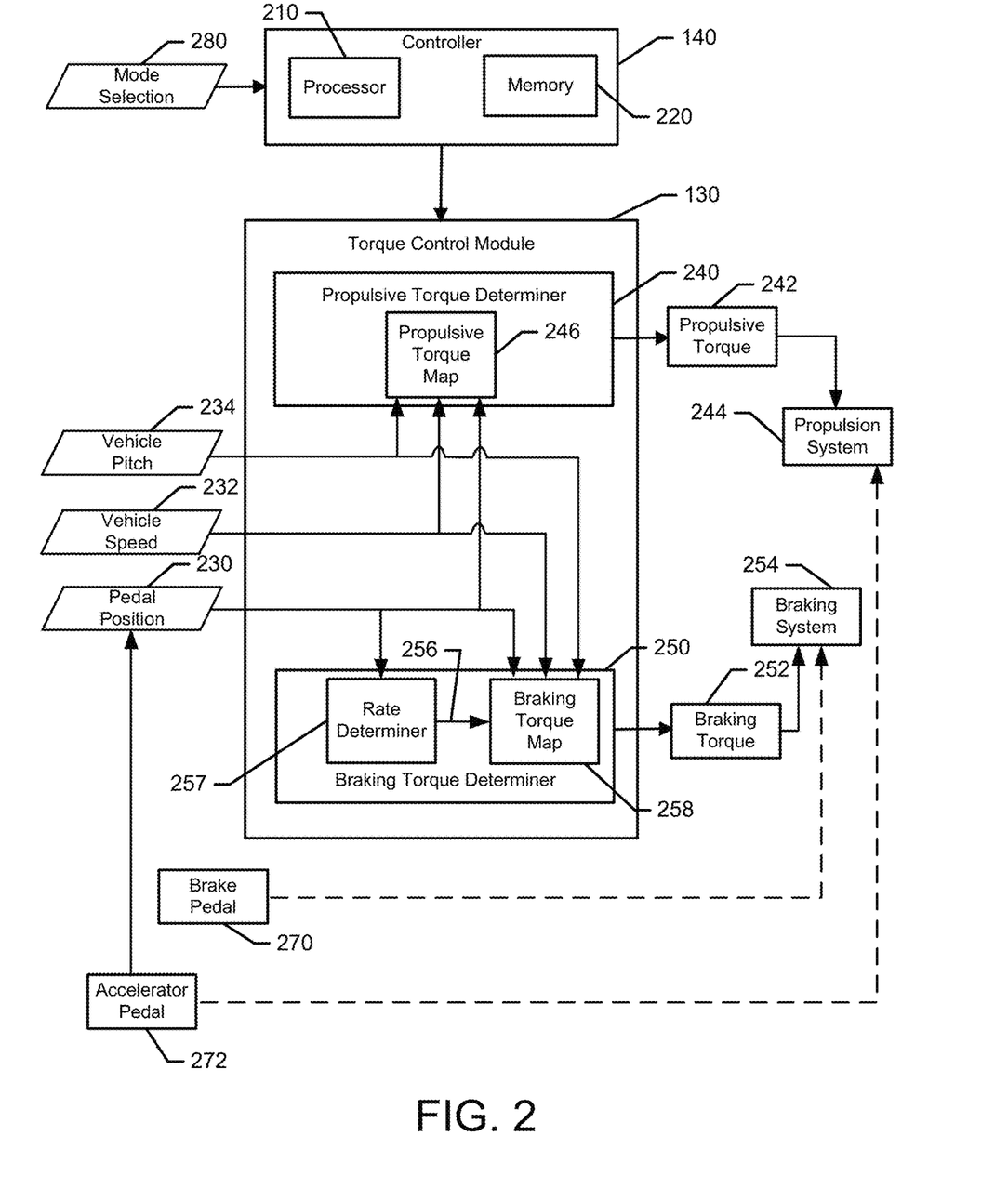
FIG. 2 illustrates a block diagram of some components of the vehicle control system of FIG. 1 in accordance with an example embodiment.

FIG. 2 illustrates a block diagram of various components of the control system 100 in greater detail. In this regard, for example, FIG. 2 illustrates example interactions between the controller 140 and the torque control module 130 relative to information received thereby (e.g., from the sensor network 160, from various ones of the components/subassemblies 150, and/or from the operator 125). Processing circuitry (e.g., a processor 210 and memory 220) at the controller 140 may process the information received by running one or more control algorithms. The control algorithms may include instructions that can be stored by the memory 220 for retrieval and execution by the processor 210. In some cases, the memory 220 may further store one or more tables (e.g., look up tables) and various calculations and/or applications may be executed using information in the tables and/or the information as described herein.

The processor 210 may be configured to execute the control algorithms in series or in parallel. However, in an example embodiment, the processor 210 may be configured to execute multiple control algorithms in parallel (e.g., simultaneously) and substantially in real time. The control algorithms may be configured to perform various calculations based on the information received regarding specific conditions of vehicle components in the torque control module 130. The control algorithms may therefore execute various functions based on the information received, and generate outputs to drive the control of net torque applied at the wheels of the vehicle 110. The torque control module 130 may itself be a control algorithm, or may include control algorithms in the form of functional modules (or submodules) configured to perform specific functions for which they are configured relating to control of the vehicle 110 in the manner described herein.

In an example embodiment, the information upon which the control algorithms operate may include pedal position 230 (e.g., of the pedal 120 of FIG. 1). In this regard, since the pedal 120 may pivot, compress or otherwise have a range of motion based on input provided by the operator 125, one or more position sensors (e.g., a Hall effect sensor) may be used to determine pedal position 230. The pedal position 230 may then be provided to the torque control module 130 for use as described in greater detail below. Pedal position 230 may be an example of information indicative of operational intent of the operator 125. As noted below, the rate of change of this information may also be indicative of the operational intent.

The information upon which the control algorithms operate may also include vehicle speed 232 and vehicle pitch 234. Vehicle speed 232 may be provided from a speedometer of the vehicle 110, from global positioning system (GPS) information, or any other suitable source. Vehicle pitch 234 may be calculated or otherwise provided based on one or more accelerometers located in the vehicle 110 (e.g., along a longitudinal centerline of the vehicle 110) and/or based on wheel speed information. However, any suitable way of measuring vehicle pitch 234 in terms of an angle of the longitudinal centerline of the vehicle 110 relative to a flat ground reference may alternatively be employed. The vehicle pitch 234 may be useful for inferring, for example, when the vehicle 110 is on the ascending side of an obstacle, and when the vehicle 110 is instead over the apex of the obstacle and on the descending side thereof. The vehicle speed 232 and vehicle pitch 234 may be examples of information indicative of vehicle status.

In an example embodiment, the torque control module 130 may be configured to include a propulsive torque determiner 240. In general, the propulsive torque determiner 240 may be configured to receive information indicative of operational intent of the operator 125 (e.g., pedal position 230) and information indicative of vehicle status (e.g., vehicle speed 232 and vehicle pitch 234) in order to determine a propulsive torque 242 to be applied to a propulsion system 244 of the vehicle 110 (e.g., a gasoline engine, electric motor, and/or the like). In other words, propulsive torque 242 may be considered to be representative of a propulsive torque request, or a request for a corresponding determined amount of propulsive torque.

In some example embodiments, the propulsive torque determiner 240 may determine the propulsive torque 242 using a propulsive torque map 246. The propulsive torque map 246 may be constructed to balance the information indicative of vehicle status with the information indicative of operational intent of the operator 125 in order to infer the desired propulsive torque of the operator 125. In an example embodiment, the propulsive torque map 246 may include a base map that maps pedal position 230 and vehicle speed 232 to a base propulsive torque. This base map may then be adjusted based on the vehicle pitch 234 to account for whether the vehicle 110 is on the ascending or descending side of an obstacle.

In an example embodiment, the propulsive torque map 246 may be generated or otherwise provided by the manufacturer. The propulsive torque map 246 may be generated based on test data gathered over many hours of testing in numerous different conditions and situations. However, the torque control module 130 of some example embodiments may further be configured to employ machine learning techniques to adjust the propulsive torque map 246 during operation. The propulsive torque map 246 may therefore be dynamically adjusted automatically by the torque control module 130 over time based on updated operational information. Moreover, the propulsive torque map 246 may be calibrated (e.g., wirelessly or via wired connection to a diagnostic system) over time based on manufacturer updated information during routine maintenance, or upon request of the operator 125 for such updates. The calibration may involve receipt of performance data from multiple vehicles and analysis of such data to then provide calibrations or other dynamic adjustments that may benefit an entire fleet or population of vehicles that include the torque control module 130 of example embodiments.

In an example embodiment, the torque control module 130 may also be configured to include a braking torque determiner 250. In general, the braking torque determiner 250 may be configured to receive information indicative of operational intent of the operator 125 (e.g., pedal position 230) and information indicative of vehicle status (e.g., vehicle speed 232 and vehicle pitch 234) in order to determine a braking torque 252 to be applied to a braking system 254 of the vehicle 110. In other words, braking torque 252 may be considered to be representative of a braking torque request, or a request for a corresponding determined amount of braking torque. The braking torque determiner 250 may also be configured to receive information indicative of a rate of change in the pedal position 230 (e.g., rate of pedal change information 256) via a rate determiner 257.

The rate determiner 257 may use pedal position 230 in order to determine the rate of pedal change information 256. In this regard, for example, the rate determiner 257 may be configured to filter pedal position 230 to determine if the operator 125 is quickly changing a position of the pedal 120. Quick changing of the position of the pedal 120 can be inferred as an intent to quickly increase braking torque 252. Accordingly, for example, the rate determiner 257 may include or be embodied as a series of filters that enable detection of certain types of changes in position of the pedal 120. In this regard, filter constants can be tuned such that a fast change in position of the pedal 120 at a low speed with large forces on the vehicle 110 due to gravity (i.e., associated with being on the descending side of the obstacle) translate into a larger and faster increase in the braking torque 252.

In this regard, for example, the braking torque determiner 250 may determine the braking torque 252 using a braking torque map 258. The braking torque map 258 may be constructed to balance the information indicative of vehicle status with the information indicative of operational intent of the operator 125 in order to infer the desired braking torque of the operator 125. In an example embodiment, the braking torque map 258 may include a base map that maps pedal position 230, rate of pedal change information 256 and vehicle speed 232 to a base braking torque. This base map may then be adjusted based on the vehicle pitch 234 to account for whether the vehicle 110 is on the ascending or descending side of a grade (e.g., associated with an obstacle or other terrain features). At low speeds, the braking torque 252 may be intended to dampen vehicle motion and prevent vehicle roll back.

In an example embodiment, the braking torque map 258 may be generated or otherwise provided by the manufacturer. The braking torque map 258 may be generated based on test data gathered over many hours of testing in numerous different conditions and situations. However, as discussed above, the torque control module 130 of some example embodiments may further be configured to employ machine learning techniques to adjust the braking torque map 258 during operation. The braking torque map 258 may therefore also be dynamically adjusted automatically by the torque control module 130 over time based on updated operational information. Moreover, the braking torque map 258 may be calibrated (e.g., wirelessly or via wired connection to a diagnostic system) over time based on manufacturer updated information during routine maintenance, or upon request of the operator 125 for such updates. The calibration may involve receipt of performance data from multiple vehicles and analysis of such data to then provide calibrations or other dynamic adjustments that may benefit an entire fleet or population of vehicles that include the torque control module 130 of example embodiments.

As can be appreciated from the descriptions of FIGS. 1 and 2, the operation of the vehicle 110 using the control system 100 described herein may be accomplished with only one pedal (i.e., pedal 120). The need for two-pedal driving may therefore be obviated. However, example embodiments could still be employed in a vehicle that has two pedals (e.g., a brake pedal 270 and an accelerator pedal 272) in some cases. For example, the operator 125 may make a mode selection 280, which may be input into the controller 140 to change from two-pedal (standard) operation to one-pedal operation associated with the driver assist functions described herein. The mode selection 280 may be made via a button, switch, selector or other dedicated operational member that the operator 125 can select/operate. However, in other cases, the mode selection 280 may be made via navigation of menu options on a visual display.

Regardless of how selected, when the mode selection 280 is made, the vehicle 110 may be shifted from a normal or standard mode of operation (which is shown by the dashed lines in FIG. 2) to a driver assisted mode of operation that includes the off-road driving assistance that is described herein (which is shown in solid lines in FIG. 2). The shift to the driver assisted mode of operation (or off-road mode of operation) may include physical modifications of couplings and connections of the vehicle 110, and/or may include only functional or electrical changes in inputs and outputs to various components. In this regard, for example, the normal or standard mode of operation may include the brake pedal 270 being operably coupled to the braking system 254 to apply brake torque to the braking system 254 proportional to the amount of depression or deflection of the brake pedal 270. In some cases, the operable coupling may be indirect, and other components or systems (e.g., an anti-lock brake (ABS) module) may be included in the operable coupling. Similarly, the normal or standard mode of operation may include the accelerator pedal 272 being operably coupled to the propulsion system 244 (e.g., directly or indirectly) to apply propulsive torque to the propulsion system 244 proportional to the amount of depression or deflection of the accelerator pedal 272. However, when the mode selection 280 is made, one of the accelerator pedal 272 or the brake pedal 270 will be operably coupled to the braking system 254 and the propulsion system 244 via the torque control module 130. In the example shown, the accelerator pedal 272 becomes the pedal 120 (i.e., the single pedal that is operably coupled to both the braking system 254 and the propulsion system 244) of FIG. 1. In some embodiments, only one of the accelerator pedal 272 or the brake pedal 270 may be operably coupled to the braking system 254 and the propulsion system 244. The other may be disabled. However, in other example embodiments, when the accelerator pedal 272 becomes the pedal 120 due to operation of the mode selection 280, the brake pedal 170 may still be operable in order to provide additional braking torque (e.g., in an additive fashion) to that which is otherwise determined by example embodiments via operation of the pedal 120 and the torque control module 130.

As noted above, the control algorithms described above (and potentially others as well) may be executed in parallel and in real time by the controller 140. The execution of the control algorithms in parallel with each other may result in multiple potentially different directions (i.e., increasing/decreasing) and magnitudes of torque requests. Accordingly, the propulsive torque 242 and the braking torque 252 may combine to define a net torque value that dictates how the vehicle 110 operates at each instant in time. As such, example embodiments may allow a single pedal (i.e., pedal 120) to be used to define a net torque value (or request) for the vehicle 110 during operation.

Example embodiments may therefore enable full control of the net torque request made of the vehicle 110 for many different situations when the mode selection 280 is made, thereby providing the ability to select enhanced operation for optimal off-road driving capability that can enhance driver confidence and vehicle capabilities. Example embodiments may also enable the user or manufacturers to have the ability to configure various aspects of the user experience by changing various parameters relating to propulsive control, brake control, etc.

Figure 3:
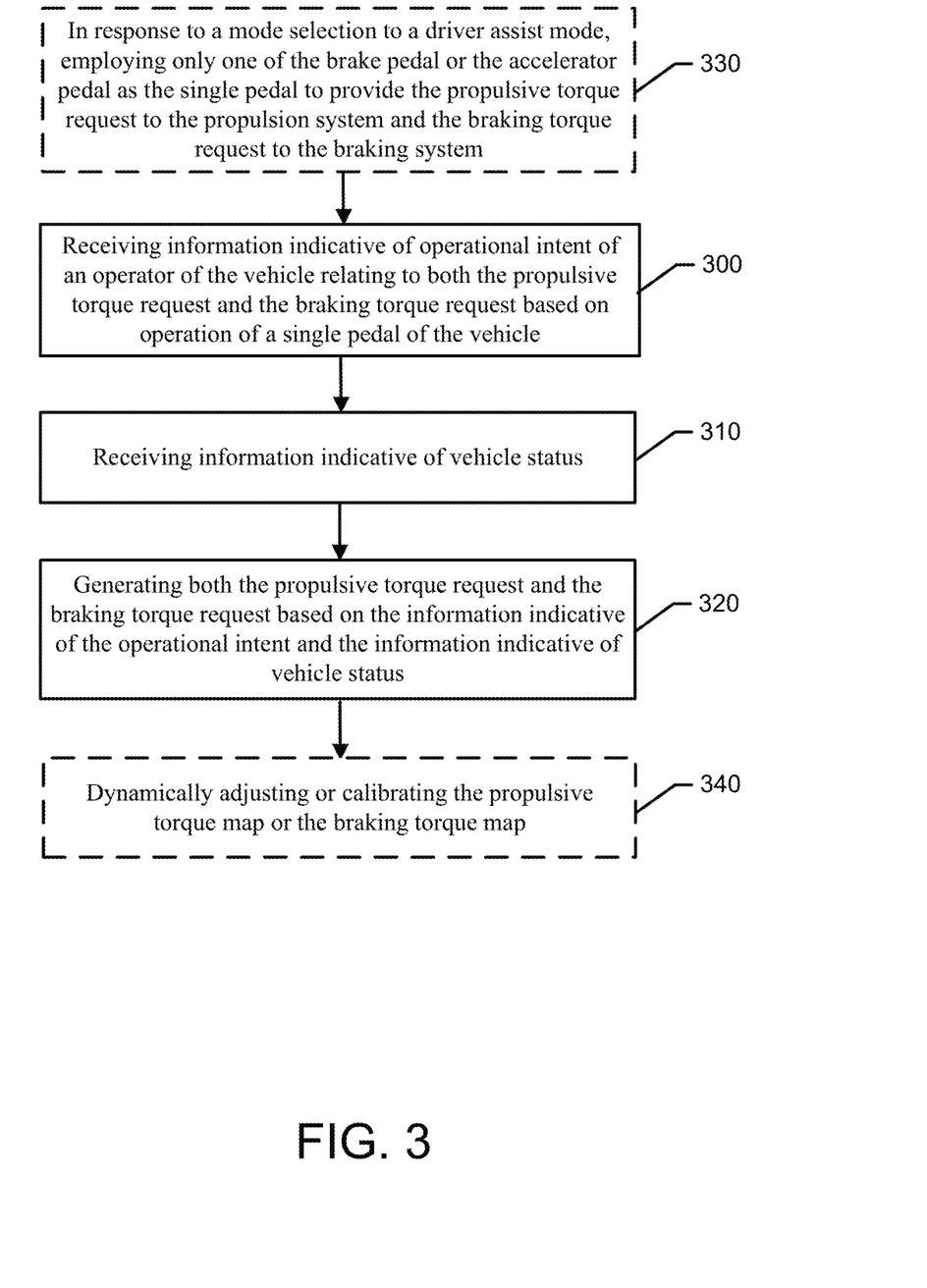
FIG. 3 illustrates a method of controlling a vehicle in accordance with an example embodiment.

FIG. 3 illustrates a block diagram of one example method of operating a vehicle that may be executed by the controller 140 of an example embodiment. In this regard, as shown in FIG. 3, the method may effectively be a method of providing a propulsive torque request to a propulsion system of a vehicle and a braking torque request to a braking system of the vehicle. The method may include receiving information indicative of operational intent of an operator of the vehicle relating to both the propulsive torque request and the braking torque request based on operation of a single pedal of the vehicle at operation 300. The method may further include receiving information indicative of vehicle status at operation 310, and generating both the propulsive torque request and the braking torque request based on the information indicative of the operational intent and the information indicative of vehicle status at operation 320.

The method of some embodiments may include additional operations, or modifications/augmentations to the methods listed above. The additional operations and modifications/augmentations may be added in any combination with each other. For example, the vehicle may have a normal mode of operation in which the propulsion system is operably coupled to an accelerator pedal for providing the propulsive torque request, and a brake pedal is operably coupled to a braking system for providing the braking torque request. Within this context, the method may further include an optional initial operation (shown in dashed lines in FIG. 3) of, in response to a mode selection to a driver assist mode, employing only one of the brake pedal or the accelerator pedal as the single pedal to provide the propulsive torque request to the propulsion system and the braking torque request to the braking system at operation 330. In some cases, the information indicative of vehicle status may include vehicle speed and vehicle pitch, and the information indicative of operational intent may include pedal position of the single pedal and a rate of change of the pedal position. In an example embodiment, generating both the propulsive torque request and the braking torque request may include applying a propulsive torque map defining a base map of propulsive torque based on the pedal position and the vehicle speed, and adjusting the base map based on the vehicle pitch to determine the propulsive torque request, and applying a braking torque map defining a base map of braking torque based on the pedal position, the rate of change of the pedal position, and the vehicle speed, and adjusting the base map based on the vehicle pitch to determine the braking torque request. In some cases, the method may further include the optional operation (shown in dashed lines in FIG. 3) of dynamically adjusting or calibrating the propulsive torque map or the braking torque map at operation 340.

A vehicle control system for a vehicle may therefore be provided. The system may include a controller, a single pedal and a torque control module. The controller may be operably coupled to components and/or sensors of the vehicle to receive information indicative of operational intent of an operator of the vehicle and information indicative of vehicle status. The single pedal may be configured to provide the information indicative of operational intent. The torque control module may be configured to generate both a propulsive torque request and a braking torque request based on the information indicative of the operational intent and the information indicative of vehicle status.

The system of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the information indicative of vehicle status may include vehicle speed and vehicle pitch, and the information indicative of operational intent may include pedal position of the single pedal. In an example embodiment, the torque control module may include a propulsive torque determiner configured to determine the propulsive torque request based on the pedal position, the vehicle speed and the vehicle pitch. In some cases, the propulsive torque determiner may include a propulsive torque map defining a base map of propulsive torque based on the pedal position and the vehicle speed, and the base map may be adjusted based on the vehicle pitch to determine the propulsive torque request. In an example embodiment, the propulsive torque map may be dynamically adjustable by the controller during use, or may be configured to be calibrated during vehicle maintenance. In some cases, the braking control module may include a braking torque determiner configured to determine the braking torque request based on the pedal position, a rate of change of the pedal position, the vehicle speed and the vehicle pitch. In an example embodiment, the braking torque determiner may include a braking torque map defining a base map of braking torque based on the pedal position, the rate of change of the pedal position, and the vehicle speed. The base map may be adjusted based on the vehicle pitch to determine the braking torque request. In some cases, the braking torque map may be dynamically adjustable by the controller during use, or is configured to be calibrated during vehicle maintenance. In an example embodiment, the braking torque determiner may employ a high pass filter to detect fast changes in the pedal position as the rate of change of the pedal position. In some cases, the vehicle may include a normal mode of operation in which a propulsion system may be operably coupled to an accelerator pedal for providing propulsive torque requests, and a brake pedal may be operably coupled to a braking system for providing braking torque requests. The controller may be configured to employ one of the brake pedal or the accelerator pedal as the single pedal and employ the torque control module to provide the propulsive torque requests to the propulsion system and the braking torque requests to the braking system in response to a mode selection to a driver assist mode.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A vehicle control system for a vehicle, the system comprising:
   a controller operably coupled to components and/or sensors of the vehicle to receive information indicative of operational intent of an operator of the vehicle and information indicative of vehicle status;
   a single pedal configured to provide the information indicative of operational intent; and
   a torque control module configured to generate both a propulsive torque request and a braking torque request based on the information indicative of the operational intent and the information indicative of vehicle status,
   wherein the information indicative of operational intent comprises pedal position of the single pedal and a rate of change of the pedal position,
   wherein a propulsive torque determiner applies propulsive torque to one or more wheels of the vehicle based on the propulsive torque request, and
   wherein the torque control module comprises the propulsive torque determiner configured to determine the propulsive torque request based on the pedal position, vehicle speed and vehicle pitch.

2. The system of claim 1, wherein the propulsive torque determiner comprises a propulsive torque map defining a base map of propulsive torque based on the pedal position and the vehicle speed, and
   wherein the base map is adjusted based on the vehicle pitch to determine the propulsive torque request.

3. The system of claim 2, wherein the propulsive torque map is dynamically adjustable by the controller during use, or is configured to be calibrated during vehicle maintenance.

4. The system of claim 1, wherein the braking control module comprises a braking torque determiner configured to determine the braking torque request based on the pedal position, the rate of change of the pedal position, the vehicle speed and the vehicle pitch.

5. The system of claim 4, wherein the braking torque determiner comprises a braking torque map defining a base map of braking torque based on the pedal position, the rate of change of the pedal position, and the vehicle speed, and
   wherein the base map is adjusted based on the vehicle pitch to determine the braking torque request.

6. The system of claim 5, wherein the braking torque map is dynamically adjustable by the controller during use, or is configured to be calibrated during vehicle maintenance.

7. The system of claim 4, wherein the braking torque determiner employs a high pass filter to detect changes in the pedal position as the rate of change of the pedal position.

8. The system of claim 1, wherein the vehicle comprises a normal mode of operation in which a propulsion system is operably coupled to an accelerator pedal for providing propulsive torque requests, and a brake pedal is operably coupled to a braking system for providing braking torque requests, and wherein the controller is configured to employ one of the brake pedal or the accelerator pedal as the single pedal and employ the torque control module to provide the propulsive torque requests to the propulsion system and the braking torque requests to the braking system in response to a mode selection to a driver assist mode.

9. The system of claim 8, wherein the accelerator pedal is the single pedal, and wherein actuation of the brake pedal in the driver assist mode provides additional braking torque to the braking torque requests.

10. A torque control module of a vehicle control system, the torque control module comprising:

a propulsive torque determiner configured to determine a propulsive torque request based on pedal position of a single pedal; and a braking torque determiner configured to determine a braking torque request based on the pedal position and a rate of change of the pedal position, wherein the torque control module is configured to determine an instantaneous net torque request as a combination of the propulsive torque request and the braking torque request based on the pedal position and the rate of change of the pedal position, wherein the propulsive torque determiner and the braking torque determiner apply net torque to one or more wheels of the vehicle based on the net torque request, wherein the propulsive torque determiner comprises a propulsive torque map defining a base map of propulsive torque based on the pedal position and vehicle speed, and wherein the base map is adjusted based on vehicle pitch to determine the propulsive torque request.

11. The torque control module of claim 9, wherein the braking torque determiner comprises a braking torque map defining a base map of braking torque based on the pedal position, the rate of change of the pedal position, and the vehicle speed, and wherein the base map is adjusted based on the vehicle pitch to determine the braking torque request.

12. The torque control module of claim 11, wherein the propulsive torque map or the braking torque map is dynamically adjustable by the controller during use, or is configured to be calibrated during vehicle maintenance.

13. The torque control module of claim 10, wherein the vehicle comprises a normal mode of operation in which a propulsion system is operably coupled to an accelerator pedal for providing propulsive torque requests, and a brake pedal is operably coupled to a braking system for providing braking torque requests, and wherein, in response to a mode selection to a driver assist mode, the torque control module is configured to employ one of the brake pedal or the accelerator pedal as the single pedal and employ the torque control module to provide the propulsive torque requests to the propulsion system and the braking torque requests to the braking system.

14. A method of providing a propulsive torque request to a propulsion system of a vehicle and a braking torque request to a braking system of the vehicle, the method comprising:

receiving information indicative of operational intent of an operator of the vehicle relating to both the propulsive torque request and the braking torque request based on operation of a single pedal of the vehicle;

receiving information indicative of vehicle status;

generating both the propulsive torque request and the braking torque request based on the information indicative of the operational intent and the information indicative of vehicle status; and applying, by a processor, a propulsive torque and a braking torque to one or more wheels of the vehicle based on the propulsive torque request and the braking torque request, wherein the information indicative of operational intent comprises pedal position of the single pedal and a rate of change of the pedal position, and wherein the information indicative of vehicle status comprises vehicle speed and vehicle pitch.

15. The method of claim 14, wherein the vehicle comprises a normal mode of operation in which the propulsion system is operably coupled to an accelerator pedal for providing the propulsive torque request, and a brake pedal is operably coupled to a braking system for providing the braking torque request, and wherein the method further comprises, in response to a mode selection to a driver assist mode, employing only one of the brake pedal or the accelerator pedal as the single pedal to provide the propulsive torque request to the propulsion system and the braking torque request to the braking system.

16. The method of claim 14, wherein generating both the propulsive torque request and the braking torque request comprises applying a propulsive torque map defining a base map of propulsive torque based on the pedal position and the vehicle speed, and adjusting the base map based on the vehicle pitch to determine the propulsive torque request, and applying a braking torque map defining a base map of braking torque based on the pedal position, the rate of change of the pedal position, and the vehicle speed, and adjusting the base map based on the vehicle pitch to determine the braking torque request.

17. The method of claim 16, further comprising dynamically adjusting or calibrating the propulsive torque map or the braking torque map.

\* \* \* \* \*

UNITED STATES PATENT AND TRADEMARK OFFICE
CERTIFICATE OF CORRECTION

| | | |
|---|---|---|
| PATENT NO. | : 12,233,892 B2 | Page 1 of 1 |
| APPLICATION NO. | : 18/426462 | |
| DATED | : February 25, 2025 | |
| INVENTOR(S) | : Michael Edward Brewer et al. | |

It is certified that error appears in the above-identified patent and that said Letters Patent is hereby corrected as shown below:

In the Claims

In Column 11, Claim 11, Line 40, "module of claim 9" should read as -- module of claim 10 --

Signed and Sealed this
Third Day of June, 2025

Coke Morgan Stewart
*Acting Director of the United States Patent and Trademark Office*